United States Patent
Ueno et al.

(10) Patent No.: US 8,926,885 B2
(45) Date of Patent: Jan. 6, 2015

(54) METHOD OF MOLDING BOOT FOR CONSTANT VELOCITY JOINT

(71) Applicant: JTEKT Corporation, Osaka (JP)

(72) Inventors: Hiroshi Ueno, Tondabayashi (JP); Kazuki Hamada, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/082,385

(22) Filed: Nov. 18, 2013

(65) Prior Publication Data

US 2014/0145372 A1 May 29, 2014

(30) Foreign Application Priority Data

Nov. 26, 2012 (JP) ................. 2012-257638

(51) Int. Cl.
| | | |
|---|---|---|
| *B29C 45/40* | (2006.01) | |
| *B29C 45/33* | (2006.01) | |
| *B29C 45/44* | (2006.01) | |
| *B29L 31/00* | (2006.01) | |

(52) U.S. Cl.
CPC ............. *B29C 45/33* (2013.01); *B29C 45/4407* (2013.01); *B29C 45/4421* (2013.01); *B29L 2031/703* (2013.01)
USPC ........................................ 264/328.1; 425/556

(58) Field of Classification Search
CPC B29C 45/2624; B29C 45/4421; B29C 45/33; B29C 33/444; B29C 33/485; B29C 2045/4414; B29L 2031/703
USPC ........................................ 264/328.1; 425/556
See application file for complete search history.

(56) References Cited

U.S. PATENT DOCUMENTS

2012/0153540 A1    6/2012    Kurimoto et al.

FOREIGN PATENT DOCUMENTS

| JP | 5-261776 A | 10/1993 |
| JP | 2012-126033 | 7/2012 |

OTHER PUBLICATIONS

Extended European Search Report issued Mar. 18, 2014 in Patent Application No. 13193788.0.
U.S. Appl. No. 14/082,793, filed Nov. 18, 2013, Ueno, et al.

*Primary Examiner* — Jacob Thomas Minskey
(74) *Attorney, Agent, or Firm* — Oblon, Spivak, McClelland, Maier & Neustadt, L.L.P.

(57) ABSTRACT

A method of molding a boot for a constant velocity joint includes: molding a compact by injection molding; raising split dies of an inner die so as to separate the split dies from a set ring; raising a core shaft of the inner die so as to separate the core shaft from the split dies; separating each of the split dies from the compact; introducing a lower end portion of the separated split die into the set ring along an engaging surface; and inserting a lower end portion of the core shaft through the set ring from above the set ring, and pressing upper end portions of the split dies downward by a protruding portion at an upper end portion of the core shaft so that the lower end portions of the split dies are engaged with the engaging surface and the split dies are brought into close contact.

2 Claims, 12 Drawing Sheets

METHOD OF MOLDING BOOT FOR CONSTANT VELOCITY JOINT

INCORPORATION BY REFERENCE

The disclosure of Japanese Patent Application No. 2012-257638 filed on Nov. 26, 2012 including the specification, drawings and abstract, is incorporated herein by reference in its entirety.

BACKGROUND OF THE INVENTION

1. Field of the Invention

The present invention relates to a method of molding a boot for a constant velocity joint.

2. Description of Related Art

For example, in vehicles such as an automobile, constant velocity joints are used in order to transmit a rotation force to driving wheels that move upward and downward according to a road surface. A boot for a constant velocity joint made of synthetic resin is fitted to the constant velocity joint, in order to protect the constant velocity joint from external muddy water or dust and to retain lubricating grease supplied to the constant velocity joint. The boot for a constant velocity joint includes a cylindrical larger-diameter portion and a cylindrical smaller-diameter portion, and a bellows portion connecting the larger-diameter portion and the smaller-diameter portion. The boot for a constant velocity joint is generally formed by a blow molding method.

In the above-described blow molding method, molding is performed by setting molten resin formed in the shape of a bag, within an outer die, and by expanding the bag-shaped molten resin using a blow of air so that the molten resin is pressed against the outer die, without using an inner die. Thus, in the blow molding method, an inner peripheral surface of the boot for a constant velocity joint cannot be molded with high precision. Therefore, it cannot be said that the blow molding method is optimal as the method of molding the boot for a constant velocity joint, which requires a precise bellows structure. Thus, as shown in Japanese Patent Application Publication No. 2012-126033 (JP 2012-126033 A), a method of molding a boot for a constant velocity joint by injection molding with use of an outer die and an inner die (core die) is suggested.

The inner die used for the injection molding in JP 2012-126033 A is constituted by a center core formed so that the diameter thereof is gradually increased from an upper end toward a lower end, and a plurality of split dies arranged along an outer periphery of the center core. This inner die is again assembled after the center core and the split dies are separated in order to take out a compact from the outer die when the molding of the boot for a constant velocity joint is completed.

However, in the inner die described in JP 2012-126033 A, a process of pushing up the center core to push the split dies radially outward (the process of changing the state from the state shown in FIG. 3 to the state shown in FIG. 1 in JP 2012-126033 A) is required when the center core and the split dies are fitted to each other. Therefore, when the center core is pushed up, a gap is likely to be formed between the split dies adjacent to each other in the circumferential direction. If injection molding is performed in a state where this gap is formed, burrs are generated in the compact.

SUMMARY OF THE INVENTION

An object of the invention is to provide a method of molding a boot for a constant velocity joint, which can prevent burrs from being generated in a compact molded by injection molding.

According to an aspect of the invention, there is provided a method of molding a boot for a constant velocity joint, the method characterized by comprising, in the following order: molding a compact of a boot for a constant velocity joint by injection molding with use of an inner die and an outer die, the inner die including a core shaft, a cylindrical set ring, and a plurality of split dies, the core shaft having a circular outer peripheral surface, and being arranged so that an axis of the core shaft extends in an up-down direction, the core shaft being inserted through the set ring, the set ring having an annular engaging surface that is a tapered surface whose diameter is gradually reduced downward, the engaging surface being formed in an inner peripheral side of an upper end portion of the set ring, the split dies being radially arranged along the outer peripheral surface of the core shaft around the axis of the core shaft, which serves as a center, and being brought into close contact with each other by introducing lower end portions of the respective split dies into the engaging surface and engaging the lower end portions of the respective split dies with the engaging surface, and the outer die being arranged so that a cavity is formed between the outer die and the inner die; raising the split dies together with the core shaft and the compact so as to separate the split dies together with the core shaft and the compact from the set ring, in a state where the inner die and the outer die are separated from each other; further raising the core shaft so as to separate the core shaft from the split dies; pulling out each of the split dies downward in a state where the split die is shifted toward the center, so as to separate the split die from the compact; moving the separated split die downward, and introducing the lower end portion of the split die into the set ring along the engaging surface; and inserting a lower end portion of the core shaft through the set ring from above the set ring, and pressing upper end portions of the respective split dies downward by a protruding portion so that the lower end portions of the respective split dies are engaged with the engaging surface and the split dies are brought into close contact with each other, the protruding portion being provided to protrude from an outer periphery of an upper end portion of the core shaft.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
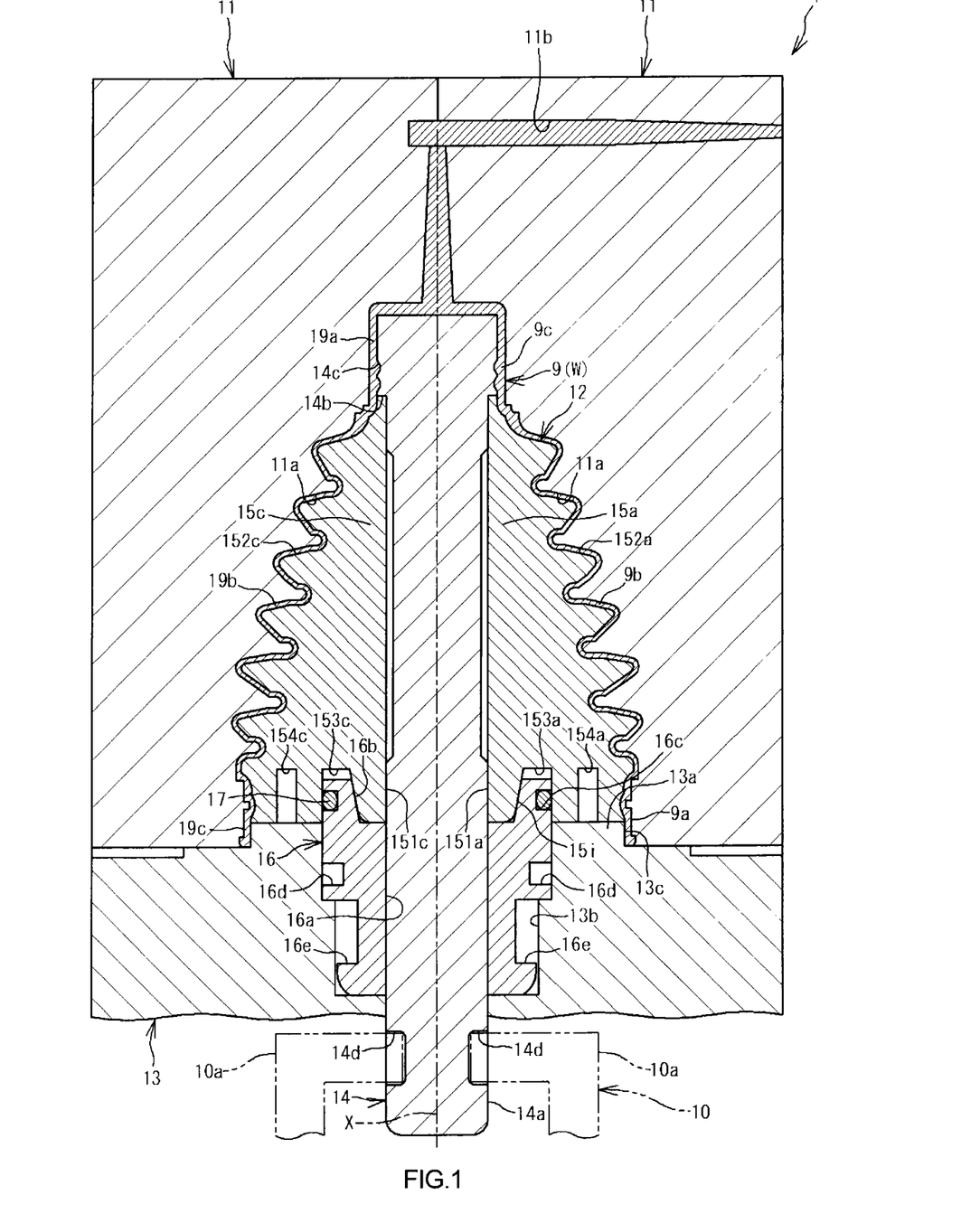
FIG. 1 is a sectional view showing a molding die used in a method of molding a boot for a constant velocity joint according to an embodiment of the invention.

Next, preferable embodiments of the invention will be described with reference to the accompanying drawings. FIG. 1 is a sectional view showing a molding die used in a method of molding a boot for a constant velocity joint according to an embodiment of the invention. In FIG. 1, a molding die 1 is used for molding a boot 9 for a constant velocity joint by injection molding. The molding die 1 is constituted by a pair of right and left outer dies 11, an inner die 12, and a lower die 13. The inner die 12 is arranged inside the outer dies 11. The lower die 13 is arranged under the outer dies 11. The boot 9 for a constant velocity joint is constituted by a larger-diameter portion 9a and a smaller-diameter portion 9c that are formed in a cylindrical shape, and a bellows portion 9b. The bellows portion 9b connects the larger-diameter portion 9a and the smaller-diameter portion 9c.

The outer dies 11 are arranged on an upper surface of the lower die 13 to be movable in a horizontal direction (right-and-left direction of FIG. 1). In internal surfaces of the outer dies 11, die surfaces 11a are formed. The die surfaces 11a correspond to the shapes of respective outer peripheral surfaces of the larger-diameter portion 9a, the bellows portion 9b, and the smaller-diameter portion 9c in the boot 9 for a constant velocity joint. A cavity 19b is formed between the die surfaces 11a and die surfaces 152a to 152h (to be described below) of the inner die 12. In the outer dies 11, an introduction path 11b is formed to introduce a molding material into the cavity 19b or the like. As the molding material, for example, an elastomer (a thermoplastic polyester elastomer, a thermoplastic polyolefin-based elastomer, or the like) is used.

On the upper surface of the lower die 13, a stepped portion 13a that protrudes upward is formed, and a fitting hole 13b is formed in the stepped portion 13a. In a side surface of the stepped portion 13a, a die surface 13c is formed. The die surface 13c corresponds to the shape of an inner peripheral surface of the larger-diameter portion 9a in the boot 9 for a constant velocity joint. A cavity 19c is formed between the die surface 13c and the die surfaces 11a of the outer dies 11. The inner die 12 is constituted by a core shaft 14, a plurality of split dies 15a to 15h (refer to FIG. 2), and a set ring 16. The core shaft 14 is arranged so that an X axis extends in an up-down direction. The split dies 15a to 15h are arranged radially outside the core shaft 14. The set ring 16 is arranged below the split dies 15a to 15h.

The core shaft 14 is made of a solid columnar member, and has a circular outer peripheral surface 14a. An annular protruding portion 14b (a pressing portion) that protrudes radially outward is formed integrally with an outer periphery of an upper end portion of the core shaft 14. A lower surface of the protruding portion 14b abuts on upper surfaces of the respective split dies 15a to 15h so as to press upper end portions of the respective split dies 15a to 15h downward (also refer to FIG. 2).

In an outer peripheral surface of the protruding portion 14b, a die surface 14c is formed. The die surface 14c corresponds to the shape of an inner peripheral surface of the smaller-diameter portion 9c in the boot 9 for a constant velocity joint. A cavity 19a is formed between the die surface 14c and the die surfaces 11a of the outer dies 11. A plurality of recessed engagement portions 14d is formed integrally with an outer periphery of a lower end portion of the core shaft 14. A pulling device 10 that pulls the lower end portion of the core shaft 14 downward is engaged with the engagement portions 14d. The pulling device 10 has a plurality of hook portions 10a, each of which can be engaged with a corresponding one of the engagement portions 14d.

Figure 2:
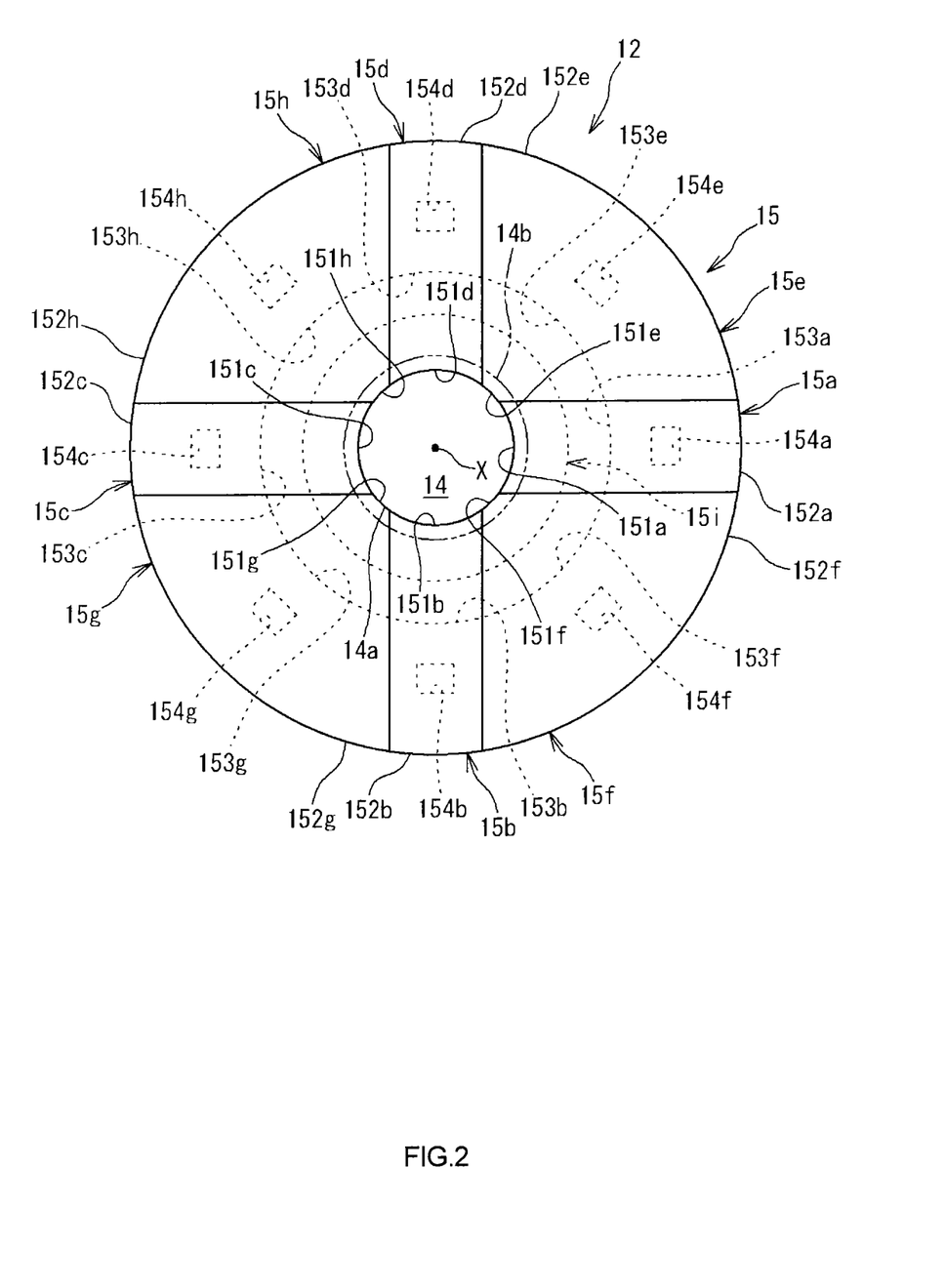
FIG. 2 is a schematic plan view showing an inner die in the molding die.

FIG. 2 is a schematic plan view showing the inner die 12. In FIGS. 1 and 2, the inner die 12 includes the first to fourth split dies 15a to 15d, and the fifth to eighth split dies 15e to 15h as the split dies 15a to 15h. Each of the split dies 15a to 15d is formed in a rectangular shape in the plan view. Each of the split dies 15e to 15h is formed in a fan shape in the plan view. The split dies 15a to 15h are radially arranged along the outer peripheral surface 14a of the core shaft 14 around the X axis of the core shaft 14, which serves as a center. In that case, the split dies 15a to 15d that are rectangular in the plan view and the split dies 15e to 15h that are fan-shaped in the plan view are alternately arranged in the circumferential direction, and are formed in a circular shape in the plan view as a whole.

In FIGS. 1 and 2, each of inner peripheral surfaces 151a to 151h of the split dies 15a to 15h is formed in the shape of a circular arc along the outer peripheral surface 14a of the core shaft 14. In outer peripheral surfaces of the split dies 15a to 15h, the die surfaces 152a to 152h are formed so as to correspond to the shapes of the respective inner peripheral surfaces of the larger-diameter portion 9a and the bellows portion 9b in the boot 9 for a constant velocity joint. Lower surfaces of the respective split dies 15a to 15h are placed on the stepped portion 13a of the lower die 13.

In the lower surfaces of the respective split dies 15a to 15h, first recessed portions 153a to 153h and second recessed portions 154a to 154h, each of which has a quadrangular section, are formed. An upper end portion of the set ring 16 is inserted into the first recessed portions 153a to 153h. First to eighth supporting member 23a to 23h to be described below are inserted into the second recessed portions 154a to 154h, respectively. The first recessed portions 153a to 153h are annularly formed as a whole in a state where the split dies 15a to 15h are arranged in a circular shape in the plan view as shown in FIG. 2. In this state, in internal surfaces of the first recessed portions 153a to 153h, an annular engaged surface 15i is formed. The annular engaged surface 15i is a tapered surface whose diameter is gradually reduced downward from an upper end. External surfaces of the first recessed portions 153a to 153h are formed so as to face the outer peripheral surface of the set ring 16 in a state where the upper end portion of the set ring 16 is inserted into the first recessed portions 153a to 153h.

In FIG. 1, the set ring 16 is formed in a cylindrical shape as a whole and is detachably fitted in the fitting hole 13b of the lower die 13. A lower portion of the core shaft 14 is inserted through an inner peripheral surface 16a of the set ring 16 so as to be movable in the up-down direction. In an inner peripheral side of the upper end portion of the set ring 16, an annular engaging surface 16b is formed. Lower end portions of the respective split dies 15a to 15h are introduced into, and engaged with the engaging surface 16b in a state where the upper end portion of the set ring 16 is inserted into the first recessed portions 153a to 153h. The engaging surface 16b is formed to have a larger diameter than the inner peripheral surface 16a, and is constituted by a tapered surface whose diameter is gradually reduced downward from an upper end.

In an outer periphery of the upper end portion of the set ring 16, an annular groove 16c is formed. An O ring 17 is fitted in the annular groove 16c. The O ring 17 comes into pressure contact with the external surfaces (opposed surfaces) of the first recessed portions 153a to 153h of the respective split dies 15a to 15h. A plurality of first engaging grooves 16d is formed under the annular groove 16c at an outer periphery of the set ring 16. A plurality of lug portions 3a (refer to FIG. 3) of a chuck 3 is engaged with the first engaging grooves 16d, respectively. In an outer periphery of a lower end portion of the set ring 16, a plurality of second engaging grooves 16e is formed. Engaging lugs 22c of holding members 22 to be described below are engaged with the second engaging grooves 16e, respectively.

Figure 3:
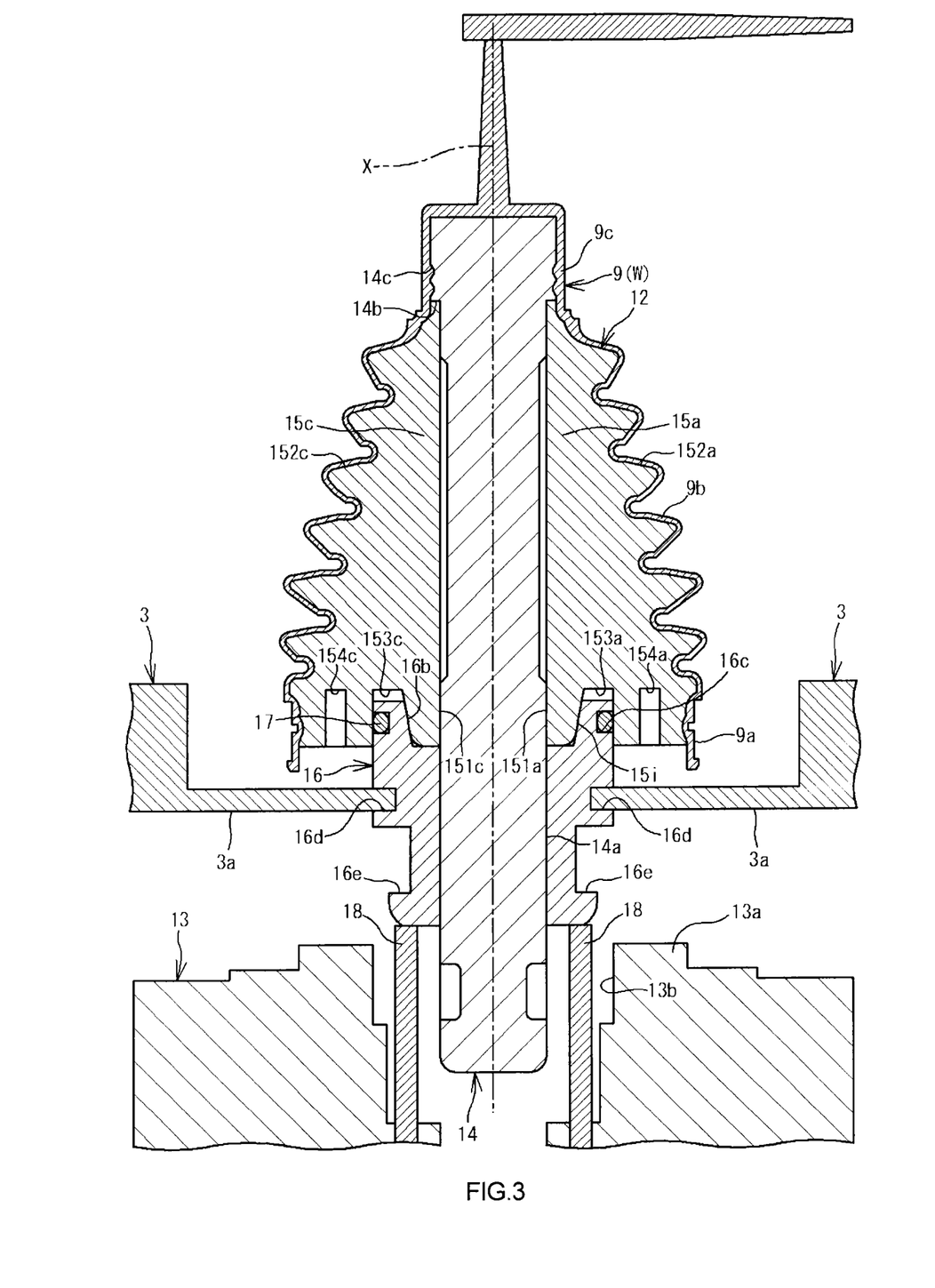
FIG. 3 is a sectional view showing a state where the inner die is removed from a lower die in the molding die.

FIG. 3 is a sectional view showing a state where the inner die 12 is removed from the lower die 13 after injection molding. In FIG. 3, a plurality of (for example, four) ejectors 18, each of which is formed in a rod shape, is arranged at the lower die 13 so as to be movable upward and downward, in order to push up a lower surface of the set ring 16 fitted in the fitting hole 13b. Thus, the lower surface of the set ring 16 can be pushed up by moving the ejectors 18 upward as shown in FIG. 3 after the paired outer dies 11 in the state shown in FIG. 1 are moved to right and left sides, respectively, so as to be separated from the inner die 12. When the set ring 16 is pushed up in this way, the core shaft 14, the split dies 15a to 15h, and a compact W of the boot 9 for a constant velocity joint are moved upward together with the set ring 16, and the inner die 12 can be separated above the lower die 13. Further, from this state, the lug portions 3a of the chuck 3 are engaged with the respective engaging grooves 16d of the set ring 16 and the lug portions 3a are raised so that the inner die 12 and the compact W can be moved to a disassembling-assembling machine 2 to be described below.

Figure 4:
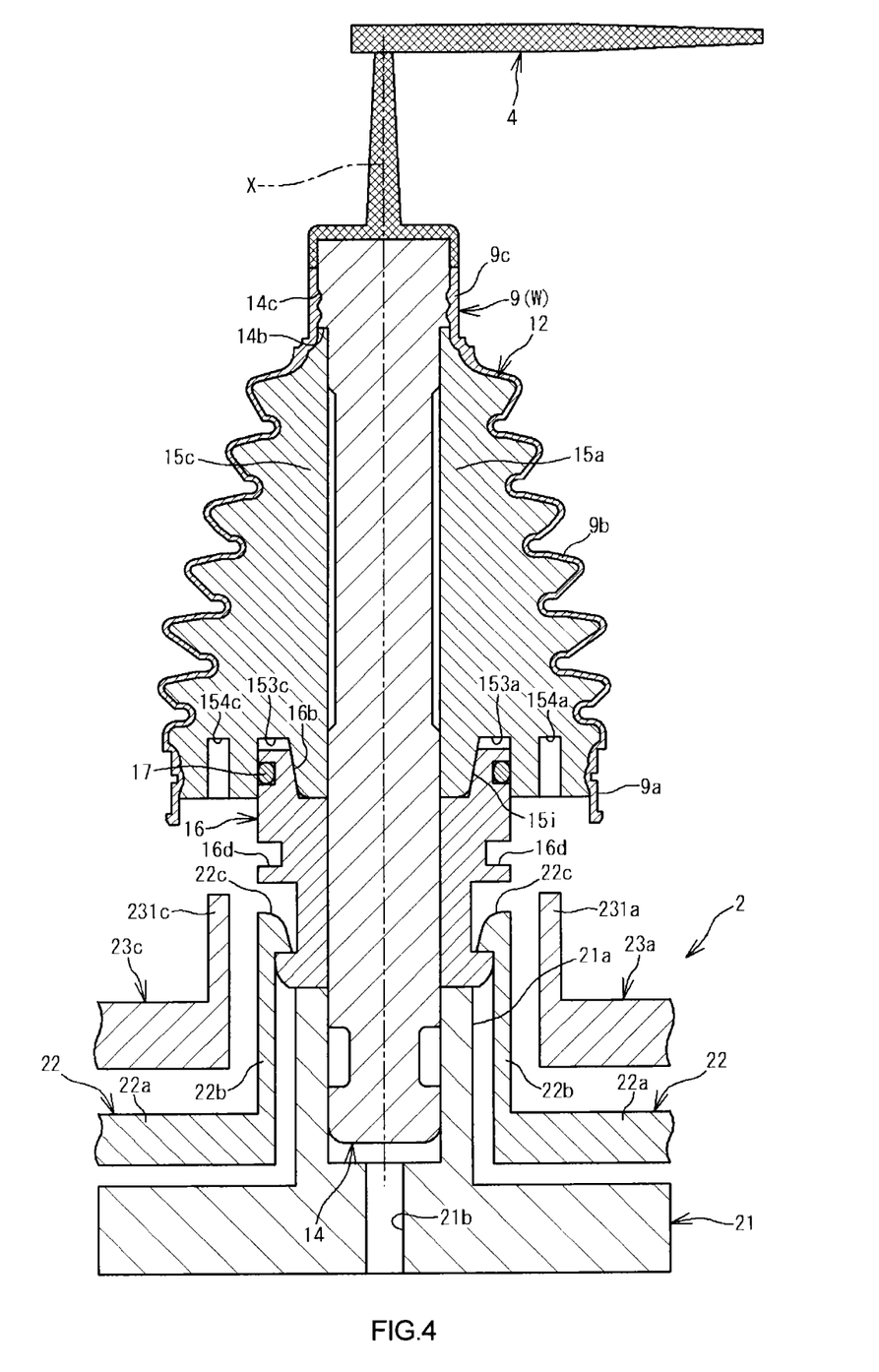
FIG. 4 is a sectional view showing a disassembling-assembling machine that disassembles and assembles the inner die.

FIG. 4 is a sectional view showing the disassembling-assembling machine 2 that disassembles and assembles the inner die 12. In FIG. 4, the disassembling-assembling machine 2 disassembles the inner die 12 moved from the molding die 1 by the chuck 3 to take out the compact W, and assembles the disassembled inner die 12 again. The disassembling-assembling machine 2 includes a base 21, the paired holding members 22, the first to eighth supporting members 23a to 23h (refer to FIG. 6), paired first clamps 24 (refer to FIG. 7), an ejector 25 (refer to FIG. 8), and paired second clamps 26 (refer to FIG. 8).

In FIG. 4, the base 21 has a cylindrical portion 21a that supports the core shaft 14 in a state where the X axis of the core shaft 14 extends in the up-down direction and the end portion of the core shaft 14 is inserted in the cylindrical portion 21a. An upper surface of the cylindrical portion 21a restricts the downward movement of the core shaft 14 by abutting on the lower surface of the set ring 16 when the lower end portion of the core shaft 14 is inserted in the cylindrical portion 21a. In a bottom of the cylindrical portion 21a, a through hole 21b is formed. The ejector 25 is inserted through the through hole 21b from below the base 21.

The paired holding members 22 hold the set ring 16 in a state where the set ring 16 is arranged on the cylindrical portion 21a of the base 21. The holding members 22 are arranged above the base 21 so as to be movable in the horizontal direction (right-and-left direction in FIG. 4). A distal end portion of each holding member 22 is formed to have an L-shape section constituted by a horizontal portion 22a and a vertical portion 22b. In an upper end portion of the vertical portion 22b, the engaging lug 22c is formed and is engaged with the corresponding second engaging groove 16e of the set ring 16. The disassembling-assembling machine 2 further includes a cutting device (not shown) that cuts a runner portion 4 (cross-hatched portion in FIG. 4) molded in the introduction path 11b of the outer dies 11, in the state shown in FIG. 4.

Figure 5:
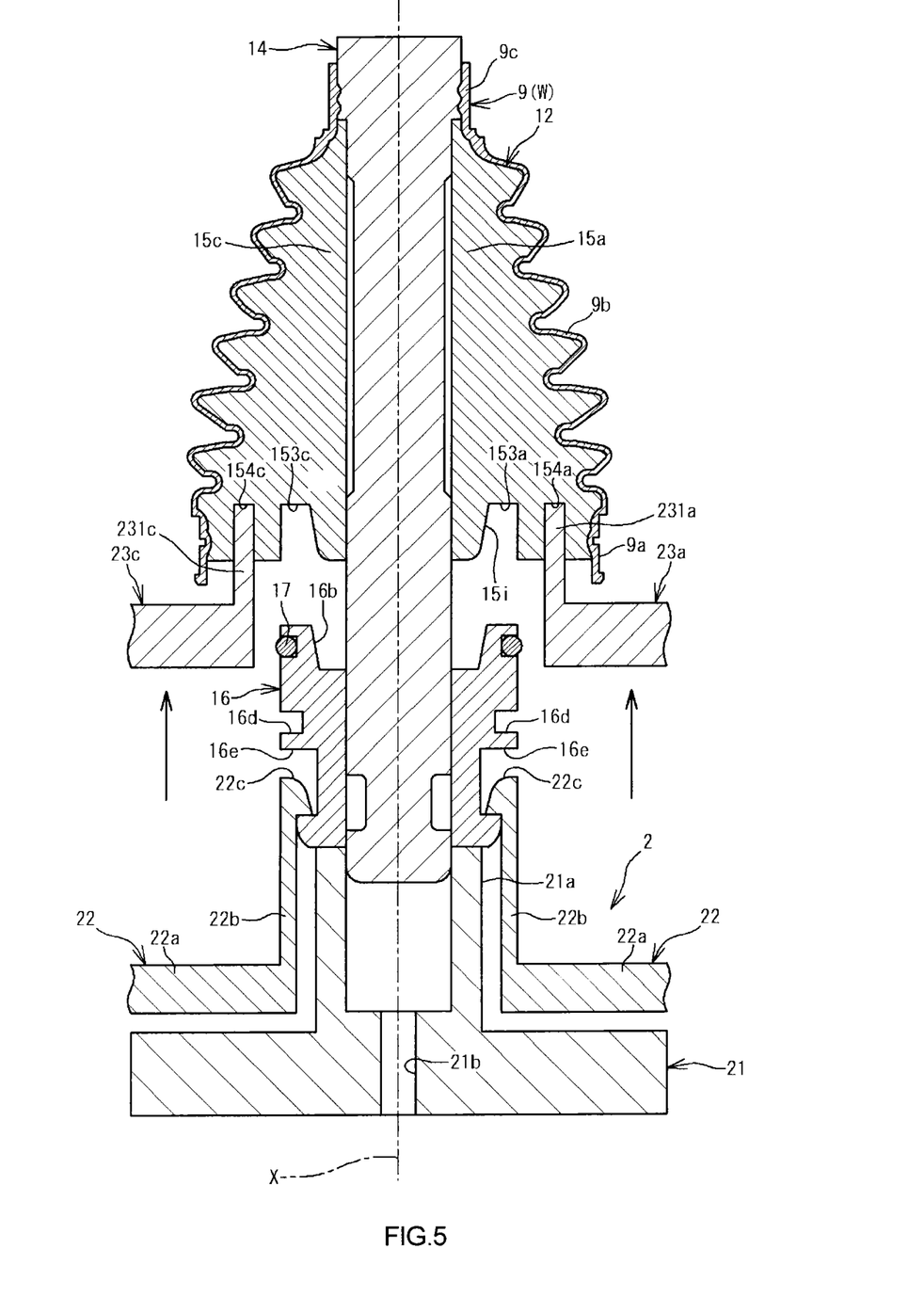
FIG. 5 is a sectional view showing the operating state of supporting members of the disassembling-assembling machine.

FIG. 5 is a sectional view showing the operating state of the first to eighth supporting members 23a to 23h of the disassembling-assembling machine 2. In FIGS. 4 and 5, the first to eighth supporting members 23a to 23h support the respective split dies 15a to 15h in a state where the split dies 15a to 15h are separated from the set ring 16. The supporting members 23a to 23h are arranged between the horizontal portions 22a of the holding members 22 and the split dies 15a to 15h and are individually movable in the up-down direction and the horizontal direction. The supporting members 23a to 23h have rod-shaped engaging portions 231a to 231h that are located at the distal end portions of the respective supporting members 23a to 23h, and that extend in the up-down direction. The engaging portions 231a to 231h are respectively engaged with the second recessed portions 154a to 154h of the split dies 15a to 15h.

Figure 6:
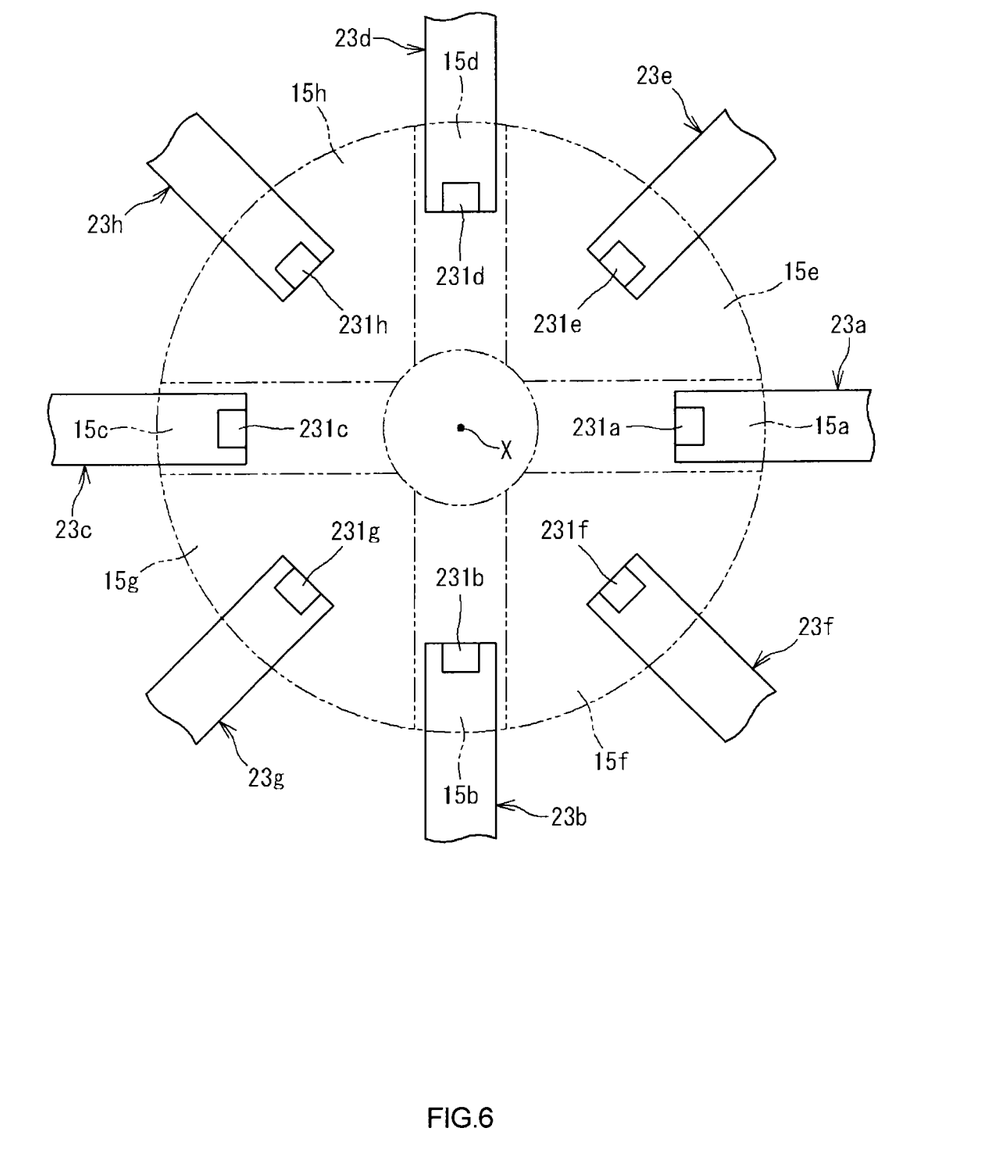
FIG. 6 is a plan view showing the supporting members.

FIG. 6 is a plan view showing the first to eighth supporting members 23a to 23h. As shown in FIG. 6, the first to eighth supporting members 23a to 23h are radially arranged around the X axis that serves as the center. Each of the engaging portions 231a to 231h of the supporting members 23a to 23h is formed to have a quadrangular section in accordance with the sectional shape of each of the second recessed portions 154a to 154h of the split dies 15a to 15h. As a result, it is possible to restrict the split dies 15a to 15h, which are supported by the supporting members 23a to 23h, from being rotated in the horizontal direction around the supporting members 23a to 23h.

Figure 7:
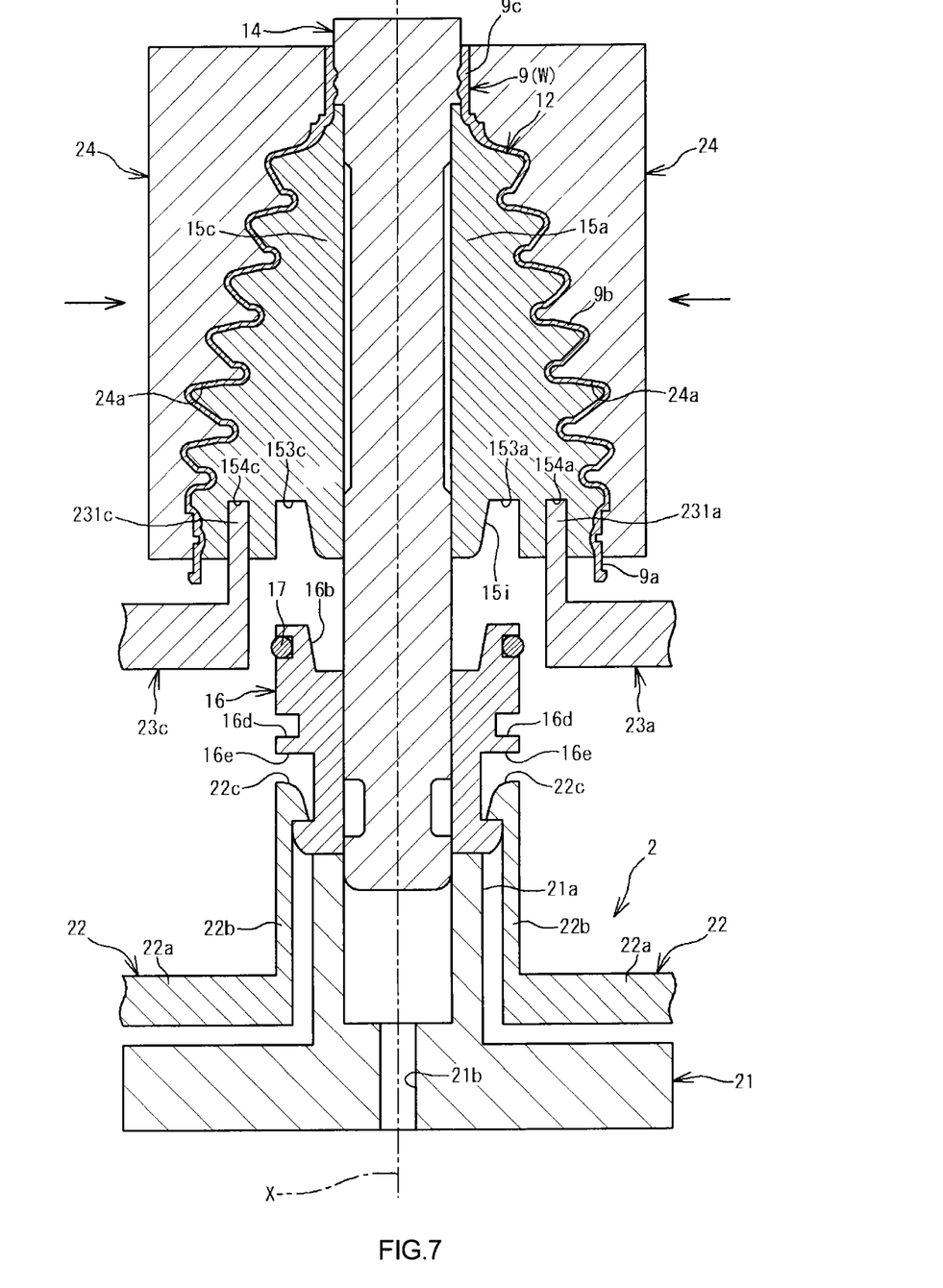
FIG. 7 is a sectional view showing the operating state of first clamps of the disassembling-assembling machine.

FIG. 7 is a sectional view showing the operating state of the first clamps 24 of the disassembling-assembling machine 2. In FIG. 7, the paired first clamps 24 hold the compact W when the split dies 15a to 15h are raised by the supporting members 23a to 23h. The first clamps 24 are arranged so as to be movable in the horizontal direction (right-and-left direction in the drawing) and in the up-down direction. In an internal surface of each first clamp 24, a holding surface 24a is formed so as to correspond to the shapes of the respective outer peripheral surfaces of the larger-diameter portion 9a, the bellows portion 9b, and the smaller-diameter portion 9c in the compact W. The compact W can be held by the holding surfaces 24a in a state where the outer peripheral surface of the compact W is sandwiched between the holding surfaces 24a on the right and left sides.

Figure 8:
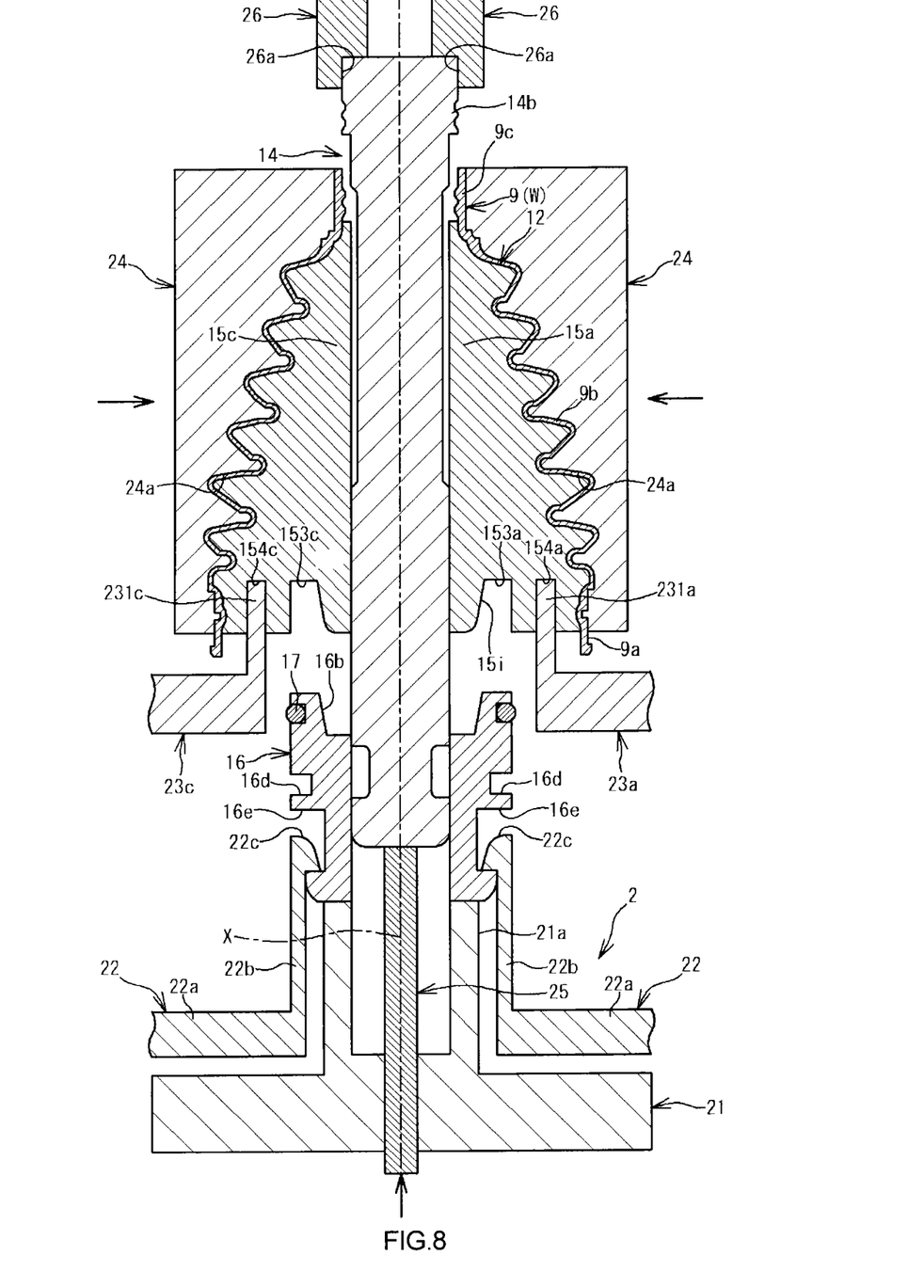
FIG. 8 is a sectional view showing the operating state of an ejector and second clamps of the disassembling-assembling machine.

FIG. 8 is a sectional view showing the operating state of the ejector 25 and the second clamps 26 of the disassembling-assembling machine 2. In FIG. 8, the ejector 25 pushes up the lower surface of the core shaft 14 inserted into the cylindrical portion 21a of the base 21, and is constituted by a rod-shaped member that can be inserted through the through hole 21b of the base 21 from below the base 21. The paired second clamps 26 hold and pull out upward the upper end portion of the core shaft 14 pushed up by the ejector 25, and are arranged above the first clamps 24 so as to be movable upward and downward. In a distal end portion of each second clamp 26, an engaging portion 26a is formed. The engaging portion 26a is engaged with an upper end corner portion of the protruding portion 14b of the core shaft 14. The core shaft 14 can be held by the engaging portions 26a in a state where the upper end portion of the core shaft 14 is sandwiched between the engaging portions 26a on the right and left sides.

Next, a method of molding the boot 9 for a constant velocity joint using the molding die 1 and the disassembling-assembling machine 2 described above will be described. First, as shown in FIG. 1, in the molding die 1, the lower end portion of the core shaft 14 is held in a state where the hook portions 10*a* of the pulling device 10 are engaged with the engagement portions 14*d* of the lower end portion of the core shaft 14, and the lower end portion of the core shaft 14 is pulled downward. At this time, the protruding portion 14*b* of the upper end portion of the core shaft 14 presses the split dies 15*a* to 15*h* of the inner die 12 downward, and therefore, the lower end portions of the split dies 15*a* to 15*h* are moved toward the X axis along the engaging surface 16*b* that is the tapered surface of the set ring 16, and are engaged with the engaging surface 16*b*. Thus, the split dies 15*a* to 15*h* adjacent to each other in the circumferential direction can be held in a state where the split dies 15*a* to 15*h* are in close contact with each other.

Next, the compact W of the boot 9 for a constant velocity joint is molded by injection molding with use of the paired outer dies 11, the inner die 12, and the lower die 13 in the molding die 1. Specifically, the compact W is molded by injection molding by introducing a molding material into the cavities 19*a* to 19*c* sequentially from the introduction path 11*b* of the outer dies 11. In that case, in the introduction path 11*b*, the runner portion 4 (refer to FIG. 3) is also molded integrally with the compact W. After the compact W is molded by injection molding, the tool is removed from the engagement portions 14*d* of the core shaft 14 and the downward pulling of the core shaft 14 is stopped.

Next, after the paired outer dies 11 are moved to the right and left sides, respectively, from the state shown in FIG. 1 so as to be separated from the inner die 12, the inner die 12 is separated from the lower die 13. Specifically, as shown in FIG. 3, the lower surface of the set ring 16 is pushed up by the ejectors 18, and the set ring 16 is moved to above the lower die 13 together with the core shaft 14, the split dies 15*a* to 15*h*, and the compact W. From this state, the set ring 16 is raised by engaging the lug portions 3*a* of the chuck 3 with the respective engaging grooves 16*d* of the set ring 16. Thus, the inner die 12 can be separated from the lower die 13.

Next, the inner die 12 is moved to the disassembling-assembling machine 2 together with the compact W by the chuck 3, and as shown in FIG. 4, the lower end portion of the core shaft 14 of the inner die 12 is inserted into the cylindrical portion 21*a* of the base 21, and the paired holding members 22 are engaged with the second engaging grooves 16*e* of the set ring 16. As a result, the set ring 16 is held on the base 21. Then, in this state, the runner portion 4 molded integrally with the compact W is cut.

Next, the first to eighth supporting members 23*a* to 23*h* are moved upward from the state shown in FIG. 4, and the engaging portions 231*a* to 231*h* thereof are engaged with the second recessed portions 154*a* to 154*h* of the respective split dies 15*a* to 15*h*. From this state, the first to eighth supporting members 23*a* to 23*h* are further moved upward to raise the respective split dies 15*a* to 15*h*. At this time, the entire inner die 12 is about to be raised. However, since the set ring 16 is held on the base 21 by the holding member 22, the split dies 15*a* to 15*h* and the core shaft 14 move upward with respect to the set ring 16 as shown in FIG. 5. Thus, the split dies 15*a* to 15*h* can be separated from the set ring 16, together with the compact W.

Next, as shown in FIG. 7, the paired first clamps 24 are respectively moved in the directions indicated by arrows in the drawing, and hold the compact W in a state where the compact W is sandwiched between the first clamps 24 on the right and left sides. Then, as shown in FIG. 8, the ejector 25 is inserted through the through hole 21*b* of the base 21 from below the base 21, and thus, the lower surface of the core shaft 14 is pushed up. At this time, the set ring 16 is held by the holding members 22, and the upward and downward movement of the split dies 15*a* to 15*h* is restricted by the first clamps 24 via the compact W. Therefore, only the core shaft 14 moves upward. As a result, the upper end portion of the core shaft 14 protrudes upward from the first clamps 24.

Figures 9A, 9B:
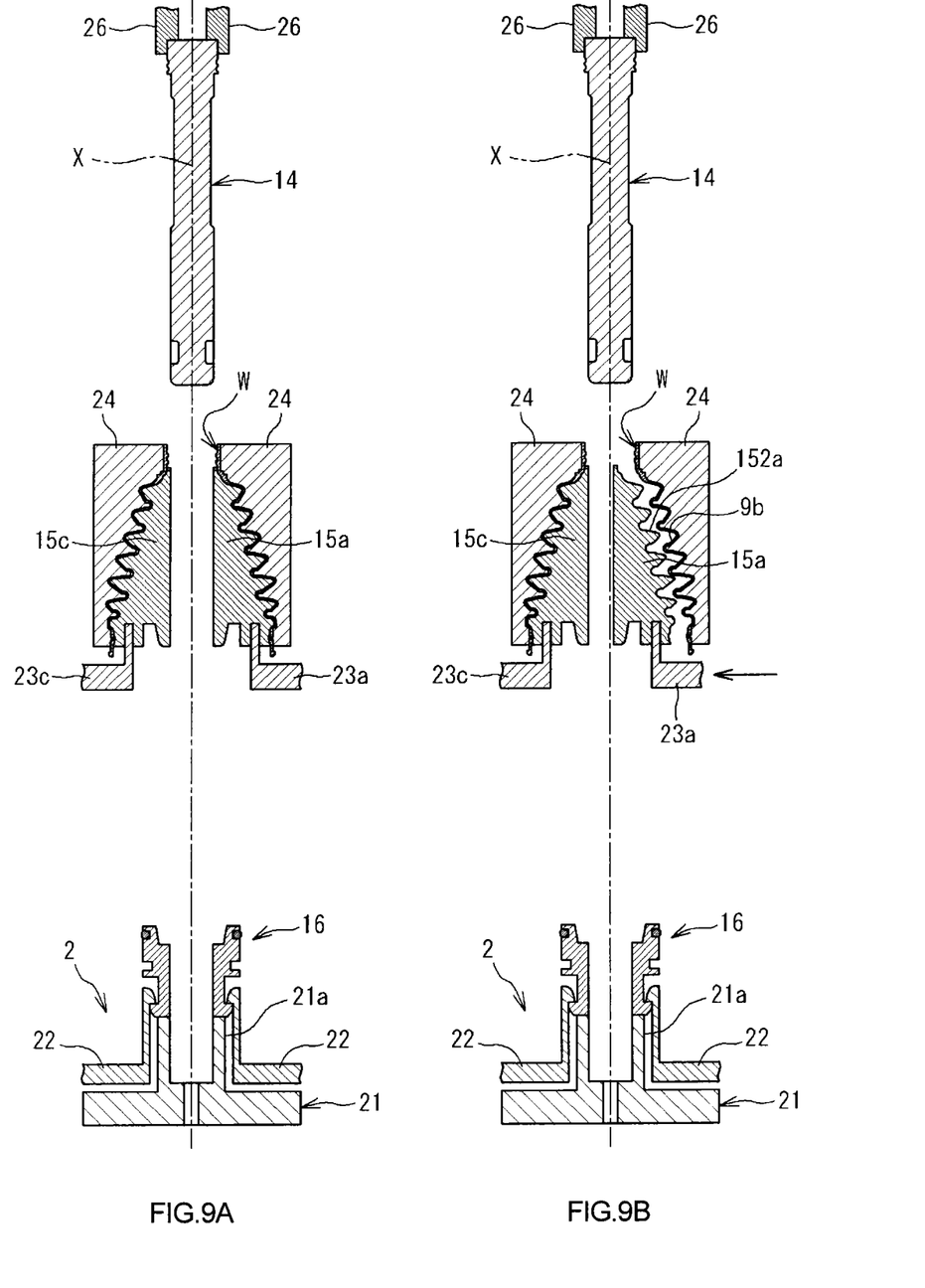
FIGS. 9A and 9B are sectional views showing the disassembling-assembling machine while processes of the molding method are performed.

Further, from this state, the core shaft 14 is held by the paired second clamps 26 in a state where the upper end portion of the core shaft 14 is sandwiched between the second clamps 26 on the right and left sides, and the second clamps 26 are moved upward. Thus, the core shaft 14 can be separated from the set ring 16 and the split dies 15*a* to 15*h* as shown in FIG. 9A. When the second clamps 26 are moved upward, the first clamps 24 are also moved upward while the first clamps 24 hold the compact W.

Figure 10A:
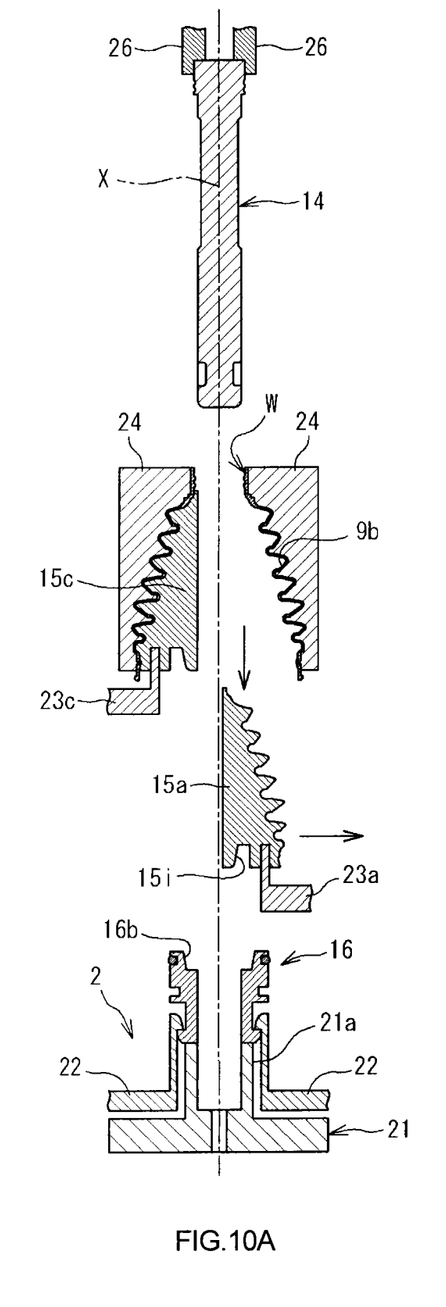
FIGS. 10A and 10B are sectional views showing the disassembling-assembling machine while processes of the molding method are performed.
Figure 10B:
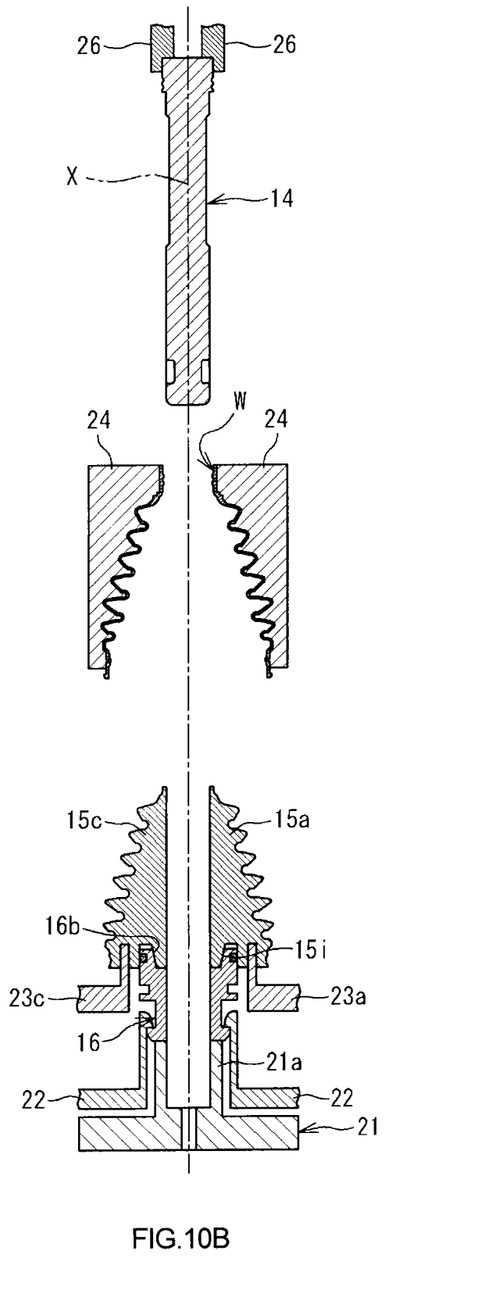
Figure 11A:
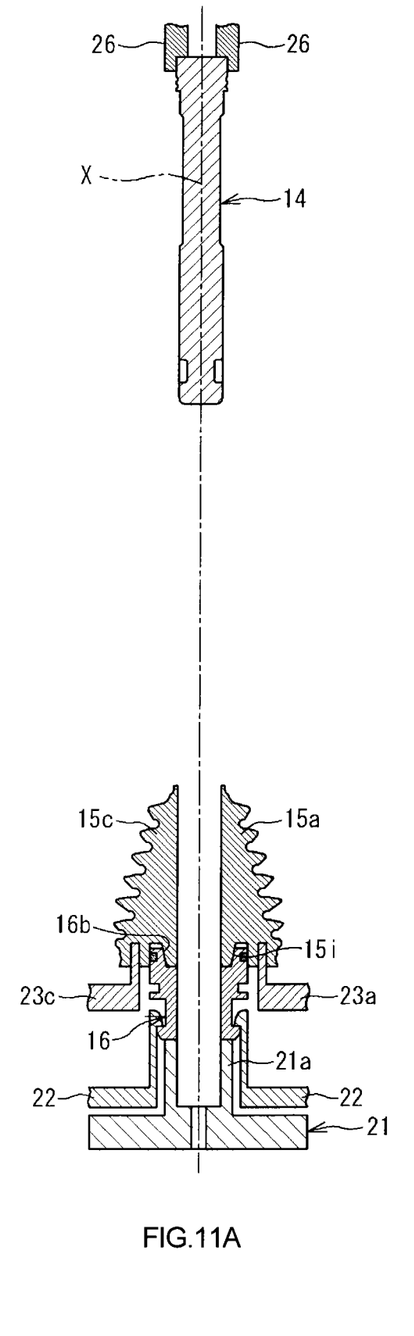
FIGS. 11A and 11B are sectional views showing the disassembling-assembling machine while processes of the molding method are performed.
Figure 11B:
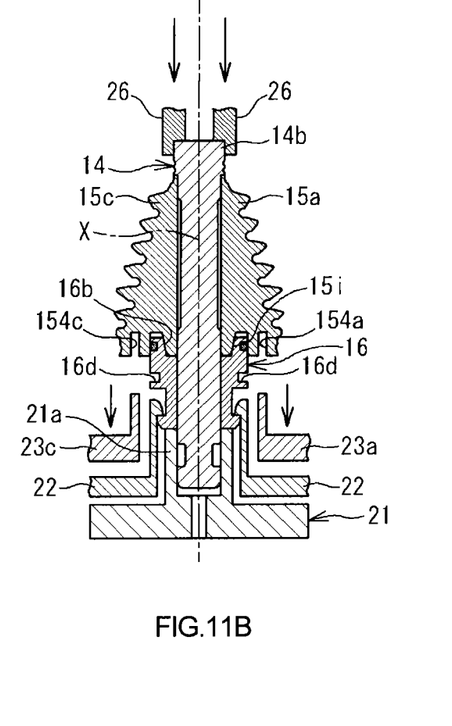

FIGS. 9 to 11 are sectional views showing the disassembling-assembling machine 2 while processes of the molding method are performed. After the core shaft 14, the set ring 16, and the split dies 15*a* to 15*h* are separated from each other in the up-down direction as shown in FIG. 9A, the split dies 15*a* to 15*h* are separated from the compact W. Specifically, as shown in FIG. 9B, the split dies 15*a* to 15*h* are horizontally shifted toward the center thereof, that is, toward the X axis by the respective supporting members 23*a* to 23*h*. At this time, the split dies 15*a* to 15*h* are moved to positions where the die surfaces 152*a* to 152*h* of the respective split dies 15*a* to 15*h* do not interfere with the bellows portion 9*b* of the compact W. Then, as shown in FIG. 10A, by moving the supporting members 23*a* to 23*h* downward, the split dies 15*a* to 15*h* are pulled out downward and separated from the compact W.

Figure 12A:
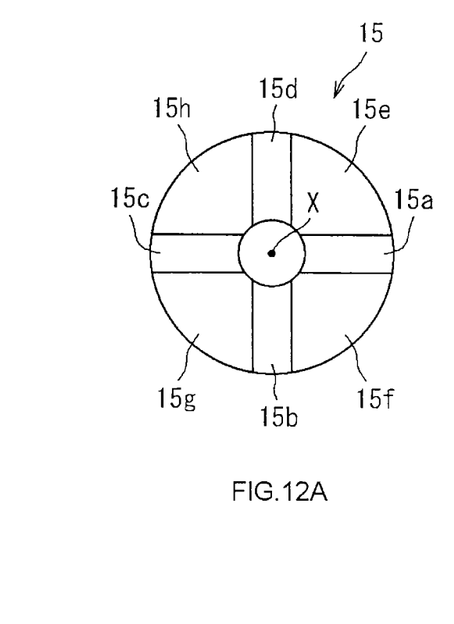
FIGS. 12A to 12D are plan views showing a procedure of separating split dies from each other by the disassembling-assembling machine.
Figure 12B:
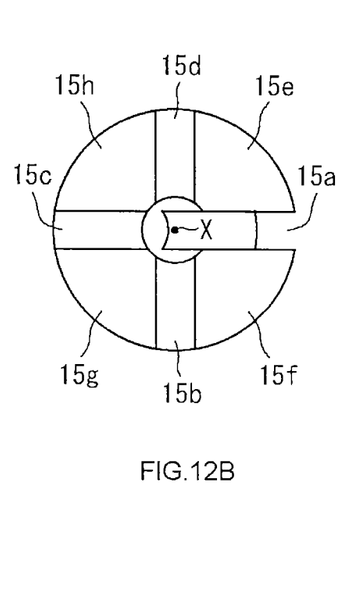
Figure 12C:
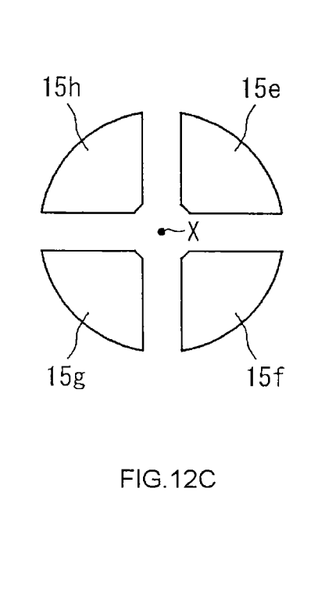
Figure 12D:
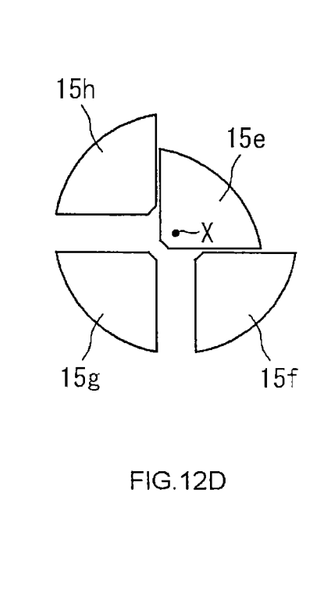

FIGS. 12A to 12D are plan views showing a detailed procedure of separating the split dies 15*a* to 15*h* from each other. First, among the split dies 15*a* to 15*h* formed in a circular shape in the plan view as shown in FIG. 12A, the first to fourth split dies 15*a* to 15*d*, each of which has a rectangular shape in the plan view, are separated from the compact W. Specifically, first, the first split die 15*a* is horizontally shifted toward the X axis and brought into a state shown in FIG. 12B. From this state, the first split die 15*a* is pulled out downward and separated from the compact W. By the same method as this, the third split die 15*c*, the second split die 15*b*, and the fourth split die 15*d* are separated in this order from the compact W and brought into the state shown in FIG. 12C.

Next, the remaining fifth to eighth split dies 15*e* to 15*h*, each of which has a fan shape in the plan view, are separated from the compact W. Specifically, first, the fifth split die 15*e* is horizontally shifted toward the X axis and brought into a state shown in FIG. 12D. From this state, the fifth split die 15*e* is pulled out downward and separated from the compact W. By the same method as this, the seventh split die 15*g*, the sixth split die 15*f*, and the eighth split die 15*h* are separated in this order from the compact W.

As shown in FIG. 10A, each of the split dies 15*a* to 15*h* separated from the compact W is horizontally moved in a direction opposite to a direction in which the split die has been horizontally shifted by a corresponding one of the supporting members 23*a* to 23*h*, and is then moved downward. As a result, as shown in FIG. 10B, the lower end portions of the respective split dies 15*a* to 15*h* are introduced into the inner peripheral side of the upper end portion of the set ring 16 while the engaged surface 15*i* of the split dies 15*a* to 15*h* moves along the engaging surface 16*b* of the set ring 16. The split dies 15*a* to 15*h* are supported by the respective supporting members 23*a* to 23*h* until the downward movement of the core shaft 14 to be described below is completed even after the split dies 15a to 15h are introduced into the set ring 16.

After all of the split dies 15a to 15h are introduced into the set ring 16, the first clamps 24 holding the compact W are horizontally moved, and then the compact W is released from the first clamps 24 and is taken out from the disassembling-assembling machine 2 so that the state is changed from the state shown in FIG. 10B to the state shown in FIG. 11A. Next, the core shaft 14 held by the second clamps 26 is moved downward. Then, as shown in FIG. 11B, the lower end portion of the core shaft 14 is inserted from above into the central portion of the split dies 15a to 15h formed in a circular shape in the plan view, the inner peripheral surface of the set ring 16, and the inner peripheral surface of the cylindrical portion 21a of the base 21, in the stated order.

After the core shaft 14 is inserted in this way, the lower surface of the protruding portion 14b of the core shaft 14 abuts on the upper surfaces of the respective split dies 15a to 15h, and presses the split dies 15a to 15h downward simultaneously. Consequently, the lower end portion of the split dies 15a to 15h are introduced into and engaged with the engaging surface 16b that is the tapered surface of the set ring 16. At this time, as the split dies 15a to 15h are moved downward by the engaging surface 16b, the split dies 15a to 15h are moved toward the X axis and are engaged with the engaging surface 16b. Therefore, the split dies 15a to 15h adjacent to each other in the circumferential direction can be brought into close contact with each other. Thus, the split dies 15a to 15h are in a circular shape in the plan view as a whole, and the inner die 12 is restored to its original state.

After the assembling of the inner die 12 is completed, the supporting members 23a to 23h are moved downward, and the split dies 15a to 15h are released from the respective supporting members 23a to 23h (refer to FIG. 11B), and in addition, the set ring 16 is released from the holding members 22. Then, the lug portions 3a of the chuck 3 are again engaged with the first engaging grooves 16d of the set ring 16, the entire inner die 12 is raised, and the inner die 12 is returned to a predetermined position in the molding die 1 as shown in FIG. 3 (more specifically, in the molding die 1 in a state where the compact W in the drawing is removed). Then, from the state in which the inner die 12 is returned to the predetermined position, the chuck 3 is disengaged, the ejectors 18 are moved downward, and the inner die 12 is fitted in the fitting hole 13b of the lower die 13 as shown in FIG. 1.

As described above, according to the method of molding the boot 9 for a constant velocity joint in the present embodiment, the engaging surface 16b formed in the set ring 16 is the tapered surface whose diameter is gradually reduced downward. Therefore, when the split dies 15a to 15h are pressed downward by the protruding portion 14b of the core shaft 14, the lower end portions of the respective split dies 15a to 15h are moved toward the X axis along the engaging surface 16b and are engaged with the engaging surface 16b. Thus, the split dies 15a to 15h adjacent to each other in the circumferential direction can be brought into close contact with each other. Accordingly, it is possible to prevent burrs from being generated in the compact W molded by injection molding.

In the process of molding the compact W by injection molding, the protruding portion 14b of the core shaft 14 is held in a state where the protruding portion 14b is pressed against the split dies 15a to 15h, and therefore, the split dies 15a to 15h adjacent to each other in the circumferential direction can be held in a state where the split dies 15a to 15h are in close contact with each other. This can effectively prevent burrs from being generated in the compact W molded by injection molding.

The invention is not limited to the above-described embodiment, and may be realized in embodiments obtained by appropriately changing the above-described embodiment. For example, the core shaft 14 in the above-described embodiment is formed by the solid columnar member. However, the core shaft may be formed by a hollow cylindrical member. The pressing portion in the above-described embodiment is constituted by the protruding portion 14b provided to protrude from the core shaft 14. However, the pressing portion may be provided as a body separate from the core shaft 14.

According to the method of molding a boot for a constant velocity joint in the invention, it is possible to prevent burrs from being generated in the compact molded by injection molding.

What is claimed is:

1. A method of molding a boot for a constant velocity joint, comprising, in the following order:

molding a compact of a boot for a constant velocity joint by injection molding with use of an inner die and an outer die, the inner die including a core shaft, a cylindrical set ring, and a plurality of split dies, the core shaft having a circular outer peripheral surface, and being arranged so that an axis of the core shaft extends in an up-down direction, the core shaft being inserted through the set ring, the set ring having an annular engaging surface that is a tapered surface whose diameter is gradually reduced downward, the engaging surface being formed in an inner peripheral side of an upper end portion of the set ring, the split dies being radially arranged along the outer peripheral surface of the core shaft around the axis of the core shaft, which serves as a center, and being brought into close contact with each other by introducing lower end portions of the respective split dies into the engaging surface and engaging the lower end portions of the respective split dies with the engaging surface, and the outer die being arranged so that a cavity is formed between the outer die and the inner die;

raising the split dies together with the core shaft and the compact so as to separate the split dies together with the core shaft and the compact from the set ring, in a state where the inner die and the outer die are separated from each other;

further raising the core shaft so as to separate the core shaft from the split dies;

pulling out each of the split dies downward in a state where the split dies are shifted toward the center, so as to separate the split dies from the compact;

moving the separated split dies downward, and introducing the lower end portion of the split dies into the set ring along the engaging surface; and inserting a lower end portion of the core shaft through the set ring from above the set ring, and pressing upper end portions of the respective split dies downward by a protruding portion so that the lower end portions of the respective split dies are engaged with the engaging surface and the split dies are brought into close contact with each other, the protruding portion being provided to protrude from an outer periphery of an upper end portion of the core shaft.

2. The method according to claim 1, further comprising:

pulling the lower end portion of the core shaft downward, and holding the protruding portion of the core shaft in a state where the protruding portion is pressed against the split dies, before molding the compact by injection molding.

* * * * *